United States Patent [19]

Draper et al.

[11] Patent Number: 5,014,166

[45] Date of Patent: May 7, 1991

[54] LIGHT UNIT

[75] Inventors: Geoffrey Draper, Lichfield; Hayden James, Staffs; Kevin Carlton, Stafford, all of England

[73] Assignee: Carello Lighting plc, Staffordshire, England

[21] Appl. No.: 419,576

[22] Filed: Oct. 10, 1989

[30] Foreign Application Priority Data

Oct. 15, 1988 [GB] United Kingdom ................. 8824206

[51] Int. Cl.[5] ................................................ B60Q 1/04

[52] U.S. Cl. ........................................ 362/61; 362/307; 362/309; 362/310

[58] Field of Search ................... 362/61, 80, 307, 308, 362/309, 310

[56] References Cited

U.S. PATENT DOCUMENTS

| | | | |
|---|---|---|---|
| 1,571,139 | 1/1926 | Nolen . | |
| 4,577,260 | 3/1986 | Tysoe | 362/61 |
| 4,811,174 | 3/1989 | Kanzler et al. | 362/61 |

*Primary Examiner*—Stephen F. Husar
*Attorney, Agent, or Firm*—Nixon & Vanderhye

[57] ABSTRACT

A motor vehicle headlamp comprising a dished body having an ellipsoidal inner reflective surface. A lamp filament is disposed at an inner focal point of the surface. A diverging meniscus lens element having a smooth convex rear surface is disposed between the reflective surface and a front cover. The lens element has a smooth concave outer surface, although the latter may be a concave fresnel lens. The convex rear surface of the lens element reduces the risk of unwanted light scatter compared with the use of a concave rear surface.

7 Claims, 2 Drawing Sheets

LIGHT UNIT

Figure 1:
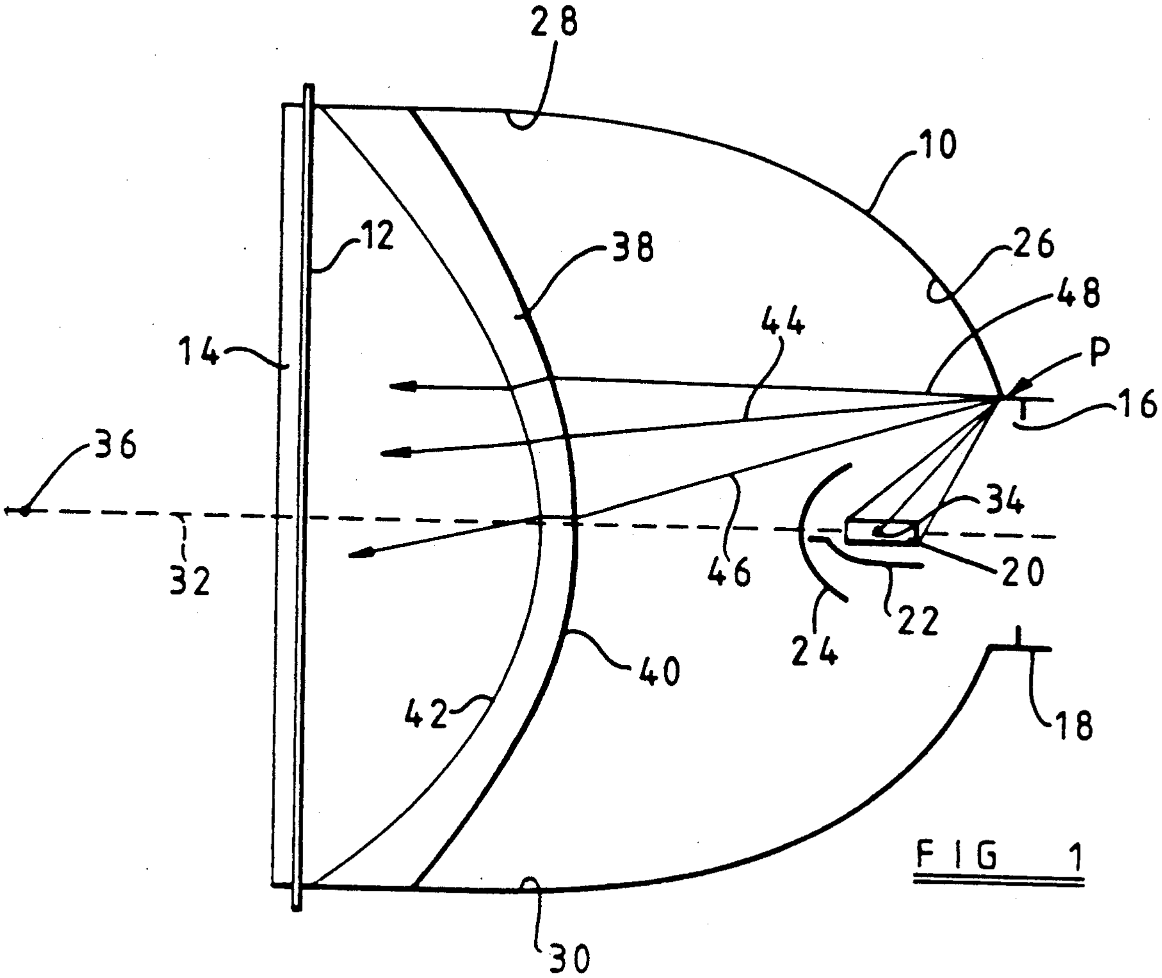

This invention relates to motor vehicle headlamps.

Motor vehicle headlamps for passing (or dipped) beam purposes have to be designed with a very strict control over the beam pattern because of prevailing legal regulations. It is commonly the practice to provide a motor vehicle headlamp for passing beam purposes with a dished reflector body having a front opening, a rear aperture and an internal paraboloidal surface. A bulb is disposed in the rear aperture of the reflector body so that a passing beam filament lies just in front of the focal point of the paraboloidal surface. The passing beam filament can have a so-called up-light shield which prevents unreflected light from passing out through the front opening of the reflector body and also has a passing beam shield which is disposed below the filament so as to prevent light from the filament from being reflected off most of the reflector below the focal axis. This passing beam filament shield has portions which are shaped so as to provide the required asymmetric cut-off to the upper portion of the beam projected by the headlamp. It will be appreciated that, because of the positioning of the filament relative to the focus, image invertion takes place. Such headlamps are also fitted with a front cover which overlies the front opening of the reflector body and which is provided with internal lensing thereon serving to shift and spread the filament images so as to provide a light distribution which conforms to the prevailing legal regulations.

Whilst headlamps having paraboloidal reflectors are relatively inexpensive to produce, there is scope for improvement of the light collection efficiency of headlamps in modern motor vehicles where the trend towards the use of headlamps of minimal vertical dimensions to enable the height of the motor vehicle bonnet to be reduced for aerodynamic reasons. As the minimum mounting height of headlamps is restricted by law, the only way of reducing bonnet height is to reduce the vertical headlamp dimension. This inevitably entails restriction of the reflector dimension which in turn leads to poor light collection properties in the case of paraboloidal reflectors.

Motor vehicle headlamps based on ellipsoidal reflectors have been previously proposed. Italian Patent 1176764 discloses the use of a reflective surface whose axial sections are elliptical. The apices of the ellipses are mutually coincident at the rear of the reflector, and the dimension along the major axes thereof increases continuously from the vertical axial section to the horizontal axial section. A double convex lens is disposed approximately mid-way between the outer focal point of the vertical axial section ellipse and that of the horizontal axial section ellipse. The focal point of such lens is coincident with the outer focal point of the vertical axial section ellipse. A filament shield or diaphragm providing the upper cut-off to the headlamp beam is disposed in a vertical plane passing through the outer focal point of the vertical axial section ellipse. The headlamp has an outer cover which is disposed outwardly of the lens and which is provided with internal lensing thereon to refract regions of the light passing through the double convex lens to produce the required light beam distribution. However, unless the ellipses have a relatively short major axial dimension (which leads to poor light collection and large filament images which are difficult to control), the headlamp will have a relatively large front-to-rear axial dimension and will therefore have a use restricted to motor vehicles where there is adequate room under the bonnet for accommodating such headlamps.

It has also been proposed in Italian Patent 327686 to provide a lamp having a reflector body with a circular front opening and an internal reflector surface lying on an ellipsoid of revolution. A bulb is mounted in the lamp at the inner focal point of the ellipse. Light from the bulb which is reflected off the ellipsoidal surface is directed towards the outer focal point of the ellipse but is incident upon a spreading lens. Such spreading lens has a concave surface facing the ellipsoidal surface or, alternatively, is a planoconcave lens with the planar surface facing the ellipsoidal surface.

According to the present invention, there is provided a motor vehicle headlamp comprising a dished reflector body having a front opening; an internal reflective surface in said body, said reflective surface being ellipsoidal with inner and outer focal points and a major axis extending through the front opening so that the outer focal point is disposed externally of the body; and a correcting lens system extending transversely of the body between the inner and outer focal points, said correcting lens system having the properties of a divergent meniscus lens whose convex surface faces said inner focal point.

The present invention is particularly applicable to headlamps wherein the dished reflector body has a rear aperture for receiving a lamp including a filament providing a light source, and means are provided for retaining said lamp in said body with said filament disposed at the inner focal point, wherein the correcting lens system is arranged relative to the inner focal point so that none of the reflected light from said ellipsoidal surface crosses the major axis of the ellipse before reaching the lens system. In this respect, due regard must be paid to the fact that the filament, not being a point light source, will have regions which are not disposed exactly on the inner focal point but will be displaced forwardly and rearwardly thereof. Additionally, due regard must be paid to the minimum distance between the major axis of the ellipse and the ellipsoidal reflective surface, bearing in mind the presence of the rear opening.

Preferably, the retaining means is arranged to retain the filament so that the centre thereof is on the inner focal point.

Whilst the convex rear surface of the lens system will normally be a smooth convex surface, the front surface of the lens system may be a smooth concave surface or it may take the form of a concave fresnel lens surface.

With the above described headlamp assembly, the design of the correcting lens system is such that, whilst divergence of the light rays incident thereon is effected, none of the light rays reflected from the ellipsoidal surface above the major axis are refracted upwardly. It is to be appreciated that light reflected from the ellipsoidal surface will be incident upon the convex rear surface of the lens system at a smaller angle of incidence than would be the case with a concave rear surface. This reduces the risk of unwanted light scatter by reflection of light off said rear surface of the lens system. Such light scatter can lead to a lamp failing to meet the strict legal regulations for headlamps which severely limit the amount of light which is permitted to be projected by the headlamp in a direction which might cause dazzling of oncoming drivers.

The correcting lens system preferably comprises merely a single lens element having said convex rear surface and said concave or fresnel type front surface. Such a lens can conveniently be manufactured easily and economically e.g. by moulding, out of a transparent synthetic resin having an adequate temperature resistance.

As is usual with headlamps, the headlamp of the present invention will be provided with a transparent front cover which closes the front opening of the reflector body and which will usually carry some optics to modify the beam pattern.

The ellipsoidal reflective surface may be confined mostly to the region of the dished body which is disposed above a horizontal plane passing through the major axis. However, it is within the scope of the present invention, in a first alternative embodiment, to provide a lower reflective surface within the body which is used only under driving (or main) beam situations. In such case, illumination is provided by an additional filament in the lamp, such additional filament being unshielded by the above-mentioned passing beam filament shield. This lower reflective surface preferably has the same shape as the first-mentioned reflective surface, although it is within the scope of the present invention to provide such lower reflective surface with a longer major axis than the first mentioned ellipsoidal reflective surface. Such lower reflective surface may have an inner focus which is coincident with the inner focus of the first-mentioned ellipsoidal reflective surface.

In a second alternative embodiment, there is provided a pair of ellipsoidal surfaces, one arranged inside the other, the ellipsoidal surfaces having major axes which may be of different length but which are preferably mutually coincident, with the inner foci also being preferably mutually coincident. The correcting lens system for such a reflector arrangement may have different optical characteristics in the lower part to those in the upper part.

A combination of both of the aforementioned first and second alternative embodiments is also possible and within the scope of the present invention, with appropriate changes being made to the correcting lens system.

Typically, the upper and lower reflective surfaces have a focal length of the order of 18 to 20 mm and a semi-major axis of the order of 100 mm. This produces a very convergent beam pattern from a light source positioned at the inner focal point. To produce a beam pattern which satisfies the prevailing ECE regulations at a distance of 25 meters from the lamp, the above-defined correcting lens system is appropriately chosen having regard, inter alia to its focal length and its positioning relative to the ellipsoidal surface, to produce a basic beam pattern which is as near as possible the same as that required by the ECE regulations. This simplifies the type of lensing required on the transparent front cover of the headlamp. It is within the scope of the present invention to utilise the headlamp in conjunction with a standard type of lamp (e.g. a lamp widely available and sold under the designation H4) which includes an appropriately shielded dipped or passing beam filament, and a main or driving beam filament, the latter being disposed behind the former.

Figure 2:
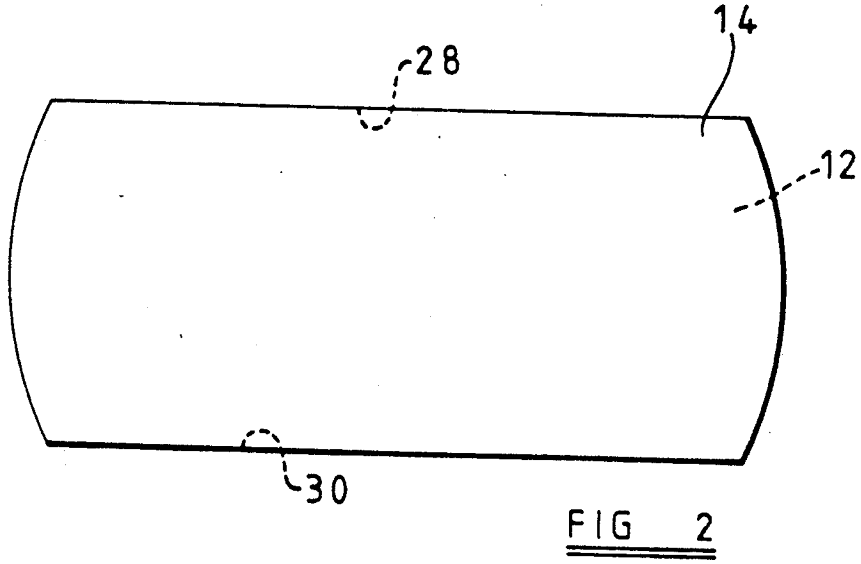
Figure 3:
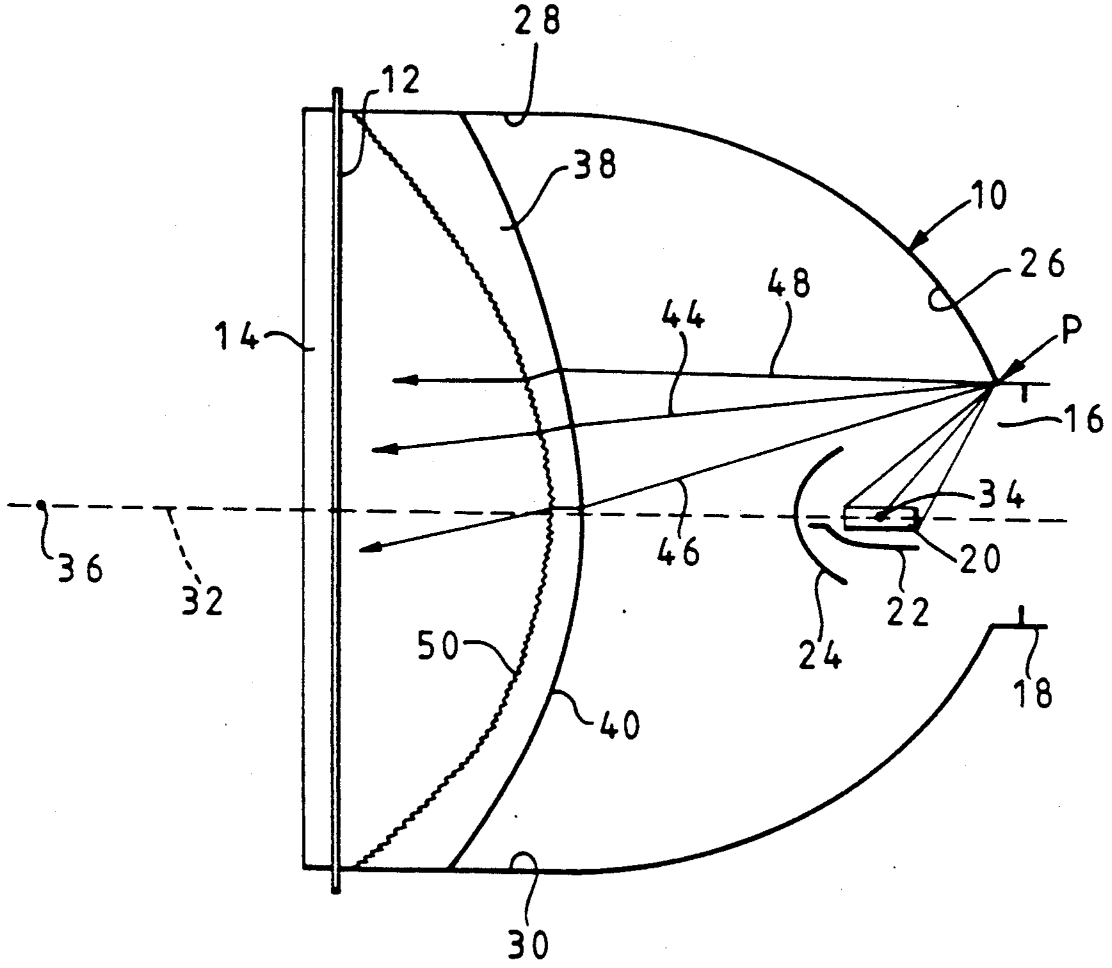

Embodiments of the present invention will now be described, by way of example, with reference to the accompaning drawings, in which:

FIG. 1 is a schematic vertical axial section (not to scale) through one embodiment of motor vehicle headlamp according to the present invention, FIG. 2 is a front view of the headlamp of FIG. 1, and FIG. 3 is a view similar to FIG. 1 of a second embodiment of motor vehicle headlamp according to the present invention.

Referring now to FIGS. 1 and 2, the motor vehicle headlamp illustrated therein comprises a dished reflector body 10 having a front opening 12 closed by a transparent front cover 14 which is adhesively secured thereto around its periphery. As can be seen from FIG. 2, the front opening 12 and front cover 14 are generally rectangular in front view with arcuately curved lateral sides. The height (i.e. the vertical dimension as viewed in FIGS. 1 and 2) is much less than the width (the horizontal direction in FIG. 2). The dished body 10 also includes a circular rear aperture 16 surrounded by an internally flanged sleeve 18 which serves to locate a standard H4 quartz halogen lamp (not fully shown). The halogen lamp includes a passing beam filament 20, a passing beam filament shield 22 and an up-light filament shield 24. The H4 lamp also includes a main or driving beam filament (not shown) and a base (also not shown) which is mounted in the sleeve 18 so that a flange on the base is in abutment with the internal flange of the sleeve 18. A retaining device such as a spring clip, (not shown) is provided for retaining the lamp in position. Interengaging lugs and recesses are provided between the sleeve 18 and the lamp in a manner known per se to ensure that the latter can only be installed in the sleeve 18 in the correct angular orientation. The filament shield 22 provides the desired asymmetric upper cut-off to a beam projected by the headlamp in use. The filament shield 22 forms part of the conventional H4 lamp and its shape and configuration, as well as its effect, are per se well known in the art. Likewise the up-light filament shield 24 has a shape and configuration which is well known in the art. The purpose of the up-light filament shield 24 is to prevent unreflected light from the filament 20 from passing directly out of the headlamp through the front opening 12.

The body 10 together with the sleeve 18 can conveniently be moulded out of a suitably heat-resistant plastics material, e.g. by injection moulding of a low profile unsaturated polyester dough moulding composition containing 12 to 18% by weight of glass fibres. The body 10 is moulded with an internal surface 26 which surrounds the rear aperture 16 and which lies on the surface generated by rotation of an ellipse about its major axis. Hereinafter, such a surface will be referred to as "ellipsoidal surface 26". The internal surface of the body 10 is not defined solely by the ellipsoidal surface 26 but is also defined by upper and lower planar portions 28 and 30 which are limited in their extent necessary to produce the required rectangular shape as viewed in FIG. 2. The provision of upper and lower planar portions is per se well known in existing headlamps which utilise paraboloidal reflectors. The whole of the internal surface of the reflector body 10 is rendered reflective by application of a vacuum deposited aluminium layer protected by a lacquer layer. The ellipsoidal surface 26 has its major axis 32 extending through the front opening 12 of the body 10 and has an inner focal point 34 lying close to the rear opening 16. and an outer focal point 36 which lies outside the body 10 and the cover 14.

Disposed within the body 10 just inside the cover 14 is a correcting lens system consisting, in this embodiment, of a single lens element 38 formed by moulding a transparent synthetic resin. The lens element 38 is of the diverging meniscus type, being provided with a smooth convex rear surface 40 facing the inner focal point 34, and a smooth concave outer surface 42 facing the opening 12. The lens element 38 extends over the entire internal cross-sectional area of the body 10 in the region of the front opening 12.

In this embodiment, the height, width and axial depth of the body 10 are 50 mm, 100 mm and 75 mm, respectively. The ellipsoidol surface 26 has a focal length of 18 mm and the semi major axis thereof is 80 mm. The passing beam filament 20 has a length of about 4.5 mm and is disposed so that its centre lies on the inner focal point 34. The optical parameters of the lens element 38 depend upon the reflector design, the optics on the front cover 14 and the beam distribution required, but will generally have an effective focal length of approximately 60 mm.

In use, light from the filament 20 which is incident upon the ellipsoidal surface 26 is reflected thereby in the direction of the lens element 38. Light which has emanated from the centre of the filament 20, i.e that portion which is coincident with the inner focal point 34, is reflected by the ellipsoidal surface towards the outer focal point 36. However, refraction occurs as a result of passage through the lens element 38 to re-direct the light so as to cross the focal axis 32 at a location between the outer focal point 36 and a point (not shown) at 25 meters from the headlamp, such point lying in the plane of the screen to which the relevant ECE regulations refer. A ray of light which emanates from the centre of the filament 20 and which is incident upon a point P at the extreme inner margin of the ellipsoidal surface 26 adjacent the rear aperture 16 is illustrated in FIG. 1 is shown as reflected ray 44. A ray of light emanating from the forward end of the filament 20 and incident upon the same point P is shown as reflected ray 46. A ray of light emanating from the rear end of the filament 20 and incident also upon the same point P is shown as reflected ray 48. The innermost points on the ellipsoidal surface 26 around the rear aperture 16 and above a horizontal plane passing through the major axis 32 are considered to be particularly critical with regard to reflections. It is important to avoid reflections occurring at such an angle that the reflected light rays cross the horizontal plane containing the major axis 32 before they reach the lens element 38. Thus, the positioning of the lens element 38 relative to the ellipsoidal surface 10 is such as to satisfy this requirement having regard to the known size and positioning of the filament 20 relative to the inner focal point 34.

Further lensing (not shown) is provided on the inner surface of the transparent front cover 14 of the headlamp and serves in a manner known per se to refract and spread the light so as to satisfy the requirements of the ECE regulations in this respect.

Under main (or driving) beam conditions, the main or driving beam filament (not shown) of the H4 lamp is illuminated. Such filament is not provided with a shield like passing beam filament shield 22 and so light from such filament can be reflected off virtually the whole of the region of the ellipsoidal reflective surface 26 which is disposed below a horizontal plane passing through the major axis 32.

Because the rear surface of the lens element 38 facing the inner focal point 34 is smoothly convex, it will be appreciated that the angle of incidence of reflected light upon said rear surface will be, for the most part, less than would be the case if the rear surface were concave. As a result, less reflection occurs off the rear surface and so there is less risk of such reflected light emerging finally from the headlamp at angles which will adversely compromise the requirement of the beam pattern to satisfy the relevant ECE regulations.

Referring now to FIG. 3, the headlamp illustrated therein is constructed in a similar way to that described above in relation to FIGS. 1 and 2. Accordingly, similar parts are accorded the same reference numerals. However, in this embodiment, the smooth concave outer surface of the lens element 38 is replaced by fresnel lensing 50 which acts in much the same way as the smooth concave surface 42.

It is also considered to be within the scope of the present invention to provide the internal reflective surface 26 as a pseudo-ellipsoidal surface by forming the body 10 so that it lies on a surface defined by elliptical sections whose semi-major axes vary continuously from a minimum in the vertical axial section to a maximum in the horizontal axial section. The ellipses defining the surface 26 in this respect may be arranged so that their apices are coincident or so that inner foci are coincident The expression "ellipsoidal surface" as used herein is to be construed accordingly.

What is claimed:

1. A motor vehicle headlamp comprising a dished reflector body having means defining a front opening; an internal reflective surface in said body, said reflective surface being ellipsoidal with inner and outer focal points and a major axis extending through said front opening so that the outer focal point is disposed externally of said dished reflector body; and a correcting lens system extending transversely of said dished reflector body between said inner and outer focal points, said correcting lens system having the properties of a divergent meniscus lens whose convex surface faces said inner focal point.

2. The headlamp according to claim 1, wherein said dished reflector body has a rear aperture for receiving a lamp including a filament providing a light source, and means are provided for retaining said lamp in said body with said filament disposed at said inner focal point; and wherein said correcting lens system is arranged relative to said inner focal point so that none of the reflected light from said reflective surface crosses the major axis of the ellipse before reaching said lens system.

3. The headlamp according to claim 2, wherein said retaining means is arranged to retain said filament so that the centre thereof is on said inner focal point.

4. The headlamp according to claim 1, wherein the convex rear surface of said lens system is a smooth convex surface.

5. The headlamp according to claim 1, wherein a front surface of the lens system is a smooth concave surface.

6. The headlamp according to claim 1, wherein a front surface of the lens system is a concave fresnel lens.

7. A headlamp as claimed in claim 1 wherein the lens system is provided by a single lens element having said convex rear surface.

* * * * *